United States Patent
Jeong et al.

(10) Patent No.: US 8,819,310 B2
(45) Date of Patent: Aug. 26, 2014

(54) SYSTEM-ON-CHIP AND DATA ARBITRATION METHOD THEREOF

(75) Inventors: Bub-chul Jeong, Yongin-si (KR); Jaegeun Yun, Hwaseong-si (KR); Junhyung Um, Seoul (KR); Jung-Sik Lee, Hwasung-si (KR); Hyun-Joon Kang, Hwaseong-si (KR); Sung-Min Hong, Hwaseong-si (KR); Ling Ling Liao, Yongin-si (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 229 days.

(21) Appl. No.: 13/276,748

(22) Filed: Oct. 19, 2011

(65) Prior Publication Data
US 2012/0131246 A1    May 24, 2012

(30) Foreign Application Priority Data
Oct. 19, 2010    (KR) .................. 10-2010-0102008

(51) Int. Cl.
*G06F 13/00* (2006.01)
*G06F 13/42* (2006.01)

(52) U.S. Cl.
CPC .... *G06F 13/4217* (2013.01); *G06F 2213/0038* (2013.01)
USPC .............................. 710/54; 710/110; 710/310

(58) Field of Classification Search
USPC ........... 710/110–113, 116, 118–119, 54, 310; 709/208–209, 211
See application file for complete search history.

(56) References Cited

U.S. PATENT DOCUMENTS

| | | | | |
|---|---|---|---|---|
| 5,996,036 A * | 11/1999 | Kelly | | 710/110 |
| 7,284,080 B2 * | 10/2007 | Lin et al. | | 710/244 |
| 7,500,045 B2 * | 3/2009 | Hofmann et al. | | 710/311 |
| 7,558,895 B2 * | 7/2009 | Bruce | | 710/110 |
| 7,587,542 B2 * | 9/2009 | Riley et al. | | 710/113 |
| 7,802,040 B2 * | 9/2010 | Aldworth et al. | | 710/118 |
| 8,310,854 B2 * | 11/2012 | MacWilliams et al. | | 365/52 |
| 8,356,119 B2 * | 1/2013 | Kocherry et al. | | 710/15 |
| 8,601,191 B2 * | 12/2013 | Aoki et al. | | 710/241 |
| 8,631,184 B2 * | 1/2014 | Mangano et al. | | 710/310 |
| 2003/0074507 A1 * | 4/2003 | Weber | | 710/240 |
| 2005/0204084 A1 * | 9/2005 | Joe et al. | | 710/113 |
| 2006/0149874 A1 | 7/2006 | Ganasan et al. | | |
| 2011/0087809 A1 * | 4/2011 | Riocreux et al. | | 710/58 |
| 2011/0087819 A1 * | 4/2011 | Riocreux et al. | | 710/305 |
| 2011/0264827 A1 * | 10/2011 | Kocherry et al. | | 710/15 |

(Continued)

FOREIGN PATENT DOCUMENTS

| | | |
|---|---|---|
| KR | 1020040056293 | 6/2004 |
| KR | 1020060039719 | 5/2006 |
| KR | 1020070050214 | 5/2007 |

*Primary Examiner* — Ryan Stiglic
(74) *Attorney, Agent, or Firm* — F. Chau & Associates, LLC

(57) ABSTRACT

A system-on-a-chip semiconductor device comprises a first master device configured to issue a request having a transaction ID, a plurality of slave devices configured to provide data in response to the request, and an interconnector configured to include a slave interface for providing the request to one or more master interfaces and for supplying response data to the first master device based on operation characteristics of the first master.

An arbitration method of an interconnector transferring a plurality of response data provided from a plurality of slave devices to a master device comprises selecting one of a plurality of arbitration modes based on operation characteristics of the master device; and transferring the response data in the order determined by transfer priority corresponding to the selected arbitration mode.

15 Claims, 6 Drawing Sheets

(56) References Cited

U.S. PATENT DOCUMENTS

| | | |
|---|---|---|
| 2011/0289253 A1* | 11/2011 | Mangano et al. ............ 710/310 |
| 2012/0079150 A1* | 3/2012 | Aoki et al. .................. 710/110 |
| 2012/0079154 A1* | 3/2012 | Mangano et al. ............ 710/112 |
| 2012/0159037 A1* | 6/2012 | Kwon et al. ................. 710/317 |
| 2012/0290752 A1* | 11/2012 | Lim ............................. 710/110 |
| 2014/0040516 A1* | 2/2014 | Riocreux et al. ............ 710/110 |

* cited by examiner

Fig. 4

| Buffer No | ID (210-a) | Burst-length (210-b) | Resident count (210-c) | 1st Data | 2nd Data | 3rd Data | 4th Data | 5th Data | 6th Data | 7th Data | 8th Data |
|---|---|---|---|---|---|---|---|---|---|---|---|
| 1 | 1 | 6 | 0x00 | 0x11 | 0x12 | 0x13 | 0x14 | 0x15 | 0x16 | | |
| 2 | 1 | 4 | 0x20 | 0x21 | 0x22 | 0x23 | 0x24 | | | | |
| 3 | 3 | 4 | 0x50 | 0x31 | 0x32 | 0x33 | 0x34 | | | | |
| 4 | 4 | 4 | 0x40 | 0x41 | 0x42 | 0x43 | 0x44 | | | | |
| 5 | 5 | 6 | 0x50 | 0x51 | 0x52 | 0x53 | 0x54 | 0x55 | 0x56 | | |
| 6 | 6 | 6 | 0x10 | 0x61 | 0x62 | 0x63 | 0x64 | 0x65 | 0x66 | | |
| 7 | 8 | 8 | 0x30 | 0x71 | 0x72 | 0x73 | 0x74 | 0x75 | 0x76 | 0x77 | 0x78 |
| 8 | 8 | 8 | 0xff | 0x81 | 0x82 | 0x83 | 0x84 | 0x85 | 0x86 | 0x87 | 0x88 |

210-d

SYSTEM-ON-CHIP AND DATA ARBITRATION METHOD THEREOF

CROSS-REFERENCE TO RELATED APPLICATIONS

This US non-provisional patent application claims priority under 35 USC §119 to Korean Patent Application No. 10-2010-0102008, filed on Oct. 19, 2010, the entirety of which is hereby incorporated by reference.

TECHNICAL FIELD

The inventive concept described herein generally relates to semiconductor devices and, more particularly, to a system-on-a-chip semiconductor device and a data arbitration method thereof.

DESCRIPTION OF RELATED ART

A system-on-a-chip (SoC) refers to semiconductor technology that implements a complicated system, having several functions, on a single chip substrate. Methods for effectively connecting intellectual properties (IPs) embedded on an SoC have drawn considerable attention. One such method is a bus-based connection method that enables IPs to communicate each other.

For example, Advanced Microcontroller Bus Architecture (AMBA) by ARM (Advanced RIC Machine) is a standard bus protocol specification for connecting and managing IPs in a SoC. The AMBA has various bus protocols such as Advanced High-Performance Bus (AHB), Advanced Peripheral Bus (APB), and AXI (Advanced eXtensile Interface). The AXI protocol has functions such as a multiple outstanding address function, a data interleaving function, and the like.

A multiple outstanding address function is a function allowing addresses corresponding to a plurality of transactions to be transferred only once. When information is provided through address channels and data channels, a multiple outstanding address function is used to successively transmit addresses with respect to a plurality of transactions at the same time as data is transmitted. The multiple outstanding address function may utilize idle transmission time occurring between addresses with respect to a plurality of transactions. A data interleaving function is a function allowing data provided from a master IP to be uniformly allocated to a plurality of slave IPs. More efficient utilization of bandwidth may be achieved through the data interleaving function.

The plurality of slave IPs in an SoC perform various different functions that are requested from a master IP. The plurality of slave IPs compete to have access to resources via a system bus. Arbitration is one way to manage data from the plurality of slave IPs.

SUMMARY OF THE INVENTION

In an embodiment of the inventive concept, a system-on-a-chip semiconductor device comprises a first master device configured to issue a request having a transaction ID, a plurality of slave devices configured to provide data in response to the request, and an interconnector configured to include a slave interface for providing the request to one or more master interfaces and for supplying response data to the first master device based on operation characteristics of the first master.

In a further embodiment of the inventive concept, the slave interface includes a reorder buffer configured to store the response data and being connected to the master interfaces, and being dedicated to the first master device. The interconnector includes a bus connecting the slave interface and the master interfaces. The salve interface further includes a selector configured to selectively output the response data stored in the reorder buffer, and a control logic configured to control the output order of the response data according to a state of the reorder buffer. The control logic decides transfer priority of response data stored in the reorder buffer in accordance with operation characteristics of the first master device. The operation characteristics of the master device are determined by whether a performance of the master device is sensitive to a first transfer latency, a specific ID of data, and average latency. Each of the plurality of buffer lines includes a transaction ID field, a burst-length field, a resident count field, and a data field. The slave interface outputs data stored in the buffer line whose resident count field has a predetermined value. The control logic further includes a specific function register (SFR) configured to store the characteristics of the master device. The specific function register is set when the master device issues a request. The slave interface is configured to perform a multi-outstanding address function and a memory interleaving function.

In an embodiment of the inventive concept, an arbitration method of an interconnector transferring a plurality of response data provided from a plurality of slave devices to a master device comprises selecting one of a plurality of arbitration modes based on operation characteristics of the master device; and transferring the response data in the order determined by transfer priority corresponding to the selected arbitration mode.

In a further embodiment of the inventive concept, the plurality of arbitration modes include a first arbitration mode for a master device that is sensitive to latency of the response data, a second arbitration mode for a master device that is sensitive to a specific transaction ID of the response data, and a third arbitration mode for a master device that is sensitive to average latency of the response data. Irrespective of transfer priority, data are forceably transferred when the data has a resident count value of a specific value. Among the plurality of response data, response data corresponding to a specific ID is primarily transferred in the second arbitration mode.

In an embodiment of the inventive concept, a system-on-a-chip semiconductor device comprises a first master device configured to issue a request, a first slave interface configured to be dedicated to the first master device, a plurality of master interfaces, and a bus configured to arbitrate data from the plurality of master interfaces to the first slave interface, wherein the first slave interface is configured to supply the data to the first master device based on operation characteristics of the first master device.

In a further embodiment of the inventive concept, the first slave interface includes a reorder buffer for storing the data, wherein the reorder buffer includes a plurality of buffer lines. The first slave interface further includes a control logic for determining an output order of the data stored in the reorder buffer based on operation characteristics of the first master device. The control logic further includes a register for storing the operation characteristics of the first master device. The first slave interface further includes a selector for selecting one of the plurality of buffer lines.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 4 is a table showing an exemplary entry of response data stored in the reorder buffer 210 shown in FIG. 3.

DETAILED DESCRIPTION

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

The AXI protocol will be used as one example for illustrating characteristics and functions of the inventive concept. However, those skilled in the art can easily understand other advantages and performances of the inventive concept according to the descriptions. The inventive concept may be embodied or applied through other embodiments. Besides, the detailed description may be amended or modified according to viewpoints and applications, not being out of the scope, and technical idea of the inventive concept.

Figure 1:
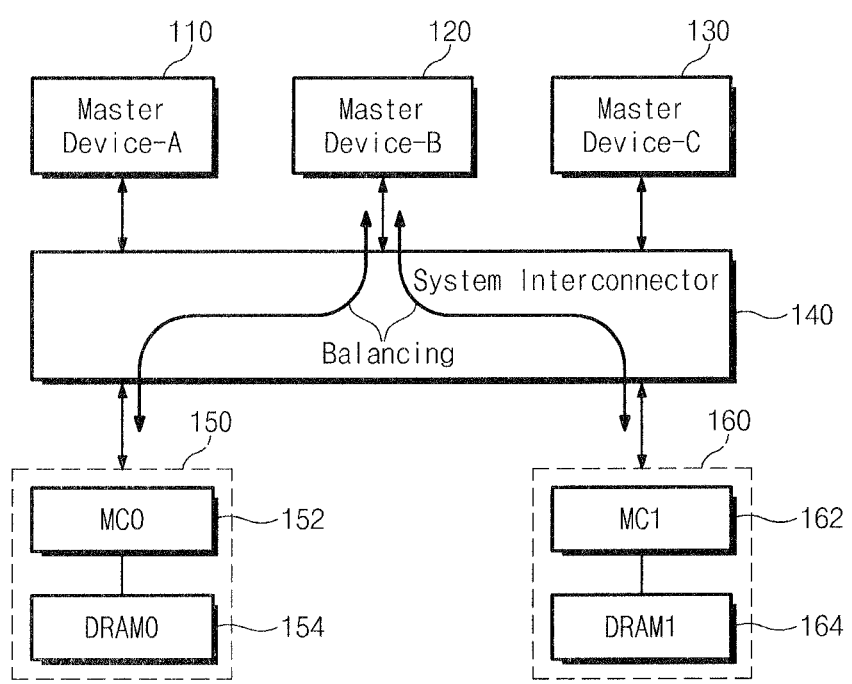
FIG. 1 is a block diagram of an SoC according to one embodiment of the inventive concept.

FIG. 1 is a block diagram of a system-on-a-chip (SoC) semiconductor device 100 according to one embodiment of the inventive concept. As illustrated, the SoC 100 includes a plurality of master devices 110, 120, and 130, an interconnector 140, and a plurality of memory devices 150 and 160 each operating as a slave device.

The master devices 110, 120, and 130 may typically include a central processing unit (CPU), a microcontroller or a microprocessor. Each of the master devices 110, 120, and 130 may request an access to the memory devices 150 and 160 through the interconnector 140. When the interconnector 140 receives multiple requests from the masters 110, 120, and 130, the interconnector 140 prioritizes the requests based upon operation characteristics of the master devices 110, 120, and 130. The interconnector 140 arbitrates communications between the master devices 110, 120, and 130 and the memory devices 150 and 160 in both ways. For example, the interconnector 40 arbitrates requests of the master devices 110, 120, and 130 and also arbitrates responses of the memory devices 150 and 160 according to the requests from the master devices 110, 120, and 130. The interconnector 140 may enhance performance of the SoC 100 by providing capability of a memory interleaving operation through the arbitration for the responses from the memory devices 150 and 160.

Particularly, the interconnector 140 performs memory interleaving. The memory interleaving means a control operation for balancing a traffic when one of master devices 110, 120 and 130 accesses all of at least two memory devices 150 and 160. The interconnector 140 may enhance channel efficiency and reduce memory access latency through the memory interleaving.

In addition, the interconnector 140 arbitrates responses of the memory devices. Requests having the same transaction ID may be transferred to the memory devices 150 and 160, respectively. Then a response corresponding to the same transaction ID may be transferred to the interconnector 140 from the memory devices 150 and 160. At this point, the interconnector 140 receives memory data corresponding to the same ID. The interconnector 140 temporarily stores the received data and transfers an order to the master device 120 generating the request after reorganizing the order. That is, the interconnector 140 transfers response data corresponding to the same ID to a master device not in the transfer order from memory devices but in the order that the master device requests.

Moreover, the interconnector 140 may maximize the performance of the SoC system 100 based on operation characteristics of a master device that accesses to memory devices 150 and 160. For example, assuming that a master device 120 has a data response delay due to increase of response traffic from other master devices 110 and 130 from the memory devices 150 and 160, the interconnector 140 arbitrates the data response according to characteristics of the master device 120 that requested the data response. For example, the interconnector 140 may prioritize the data response stored in an internal buffer (e.g., reorder buffer) based on operation characteristics of the master device 120.

The memory devices 150 and 160 may be one of slave IPs electrically connected to the interconnector 140. The memory device 150 may include a memory controller 152 and a DRAM 154, and the memory device 160 may include a memory controller 162 and a DRAM 164.

As discussed above, the interconnector 140 of the system-on-a-chip (SoC) according to the inventive concept arbitrates a bidirectional traffic between master devices 110, 120, and 130 and slave devices 150 and 160. For example, the interconnector 40 arbitrates not only requests from the master devices 110, 120, and 130 to the salve devices 150 and 160 but also response data on the requests, enhancing performance of the SoC 100, whose master devices 110, 120 and 130 may have performance degradation due to data latency or kind of response from the memory devices 150 and 160. The interconnector 40 may enhance SoC performance by prioritizing response data from the memory devices 150 and 160 based on operating characteristics of the master devices 110, 120, and 130.

Figure 2:
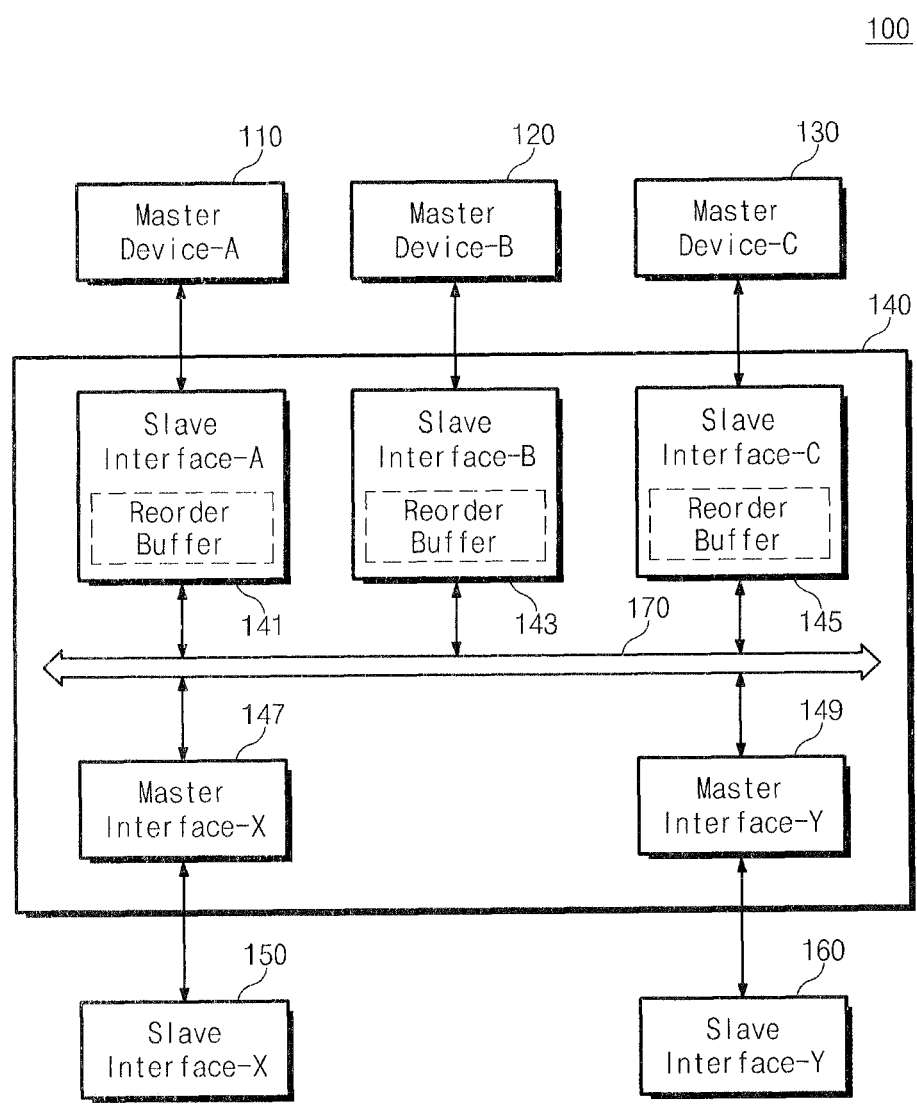
FIG. 2 a block diagram of an SoC and an interconnector according to the inventive concept.

FIG. 2 is FIG. 1 including a detailed block diagram of the interconnector 140 according to the inventive concept. Referring to FIG. 2, the interconnector 140 includes interfaces a plurality of slave interfaces 141, 143, and 145, a plurality of master interfaces 147 and 149, and a bus 170.

Each of the master devices 110, 120, and 130 may provide information including a command, an address, and data to the interconnector 140 to access a selected slave device or devices from the slave devices 150 and 160. Each master device, e.g., 110, has five independent channels AW, W, B, AR, and R and the interconnector 140 also includes corresponding channels to the master device 110. A write request is transferred to the channel port AW, write data is transferred to the channel port W, a response to the write request is transferred to the channel port B, a read request is transferred to the channel port AR, and data read from a memory is transferred to the channel port R in response to the read request. The master devices 110, 120, and 130 may include, for example, a central processing unit (CPU), a microcontroller or a microprocessor.

The slave interfaces 141, 143, and 145 are tied to the master devices 110, 120, and 130, respectively. For example, the slave interface-A 141 is connected to its corresponding master device-A 110; the slave interface-B 143 is connected to its corresponding master device-B 120; the slave interface-C 145 is connected to its corresponding master device-C 130. The slave interfaces 141, 143, and 145 include reorder buffers 141, 143, 145, respectively.

The master interfaces 147 and 149 are tied to the slave devices 150 and 160, respectively. The master interface-X 147 is connected to the corresponding slave device-X 150, and the master interface-Y 149 is connected to the corresponding slave device-Y 160. The master interfaces 147 and 149 transfer access requests from the salve interfaces 141, 143, and 145 to the corresponding salve devices 150 and 160, respectively. The master interfaces 147 and 149 may transfer response data provided from the slave devices 150 and 160 to a slave interface having ownership to the bus 170.

The slave interfaces 141, 143, and 145 according to the inventive concept arbitrate a traffic corresponding to a request from a master device. In addition, each of the slave interfaces 141, 143, and 145 arbitrate response data that are transferred through the bus 170 to one of the slave interfaces 141, 143, and 145 from the slave devices 150 and 160. For example, the slave interface-A 141 may arbitrate response data based on operation characteristics of the master device-A 110; the slave interface-B 143 may arbitrate response data based on operation characteristics of the master device-B 120; the slave interface-C 145 may arbitrate response data based on operation characteristics of the master device-C 130. Hereinafter, explanation of operations of the respective slave interfaces 141, 143, and 145 will be replaced with explanation of one slave interface-A 141.

The slave interface-A 141 is fully tied to the master device-A 110 so that other master devices 120 and 130 are not able to access to the slave interface-A 141. The slave interface-A 141 performs a memory interleaving operation in response to a read or write request transferred from the master device-A 110. The slave interface-A 141 arbitrates response data to the request of the master device-A 110. Particularly, the slave interface-A 141 may regulate a transfer order of buffered response data based on operation characteristics of the master device-A 110.

For example, assuming that response delay occurs due to increase of response traffic to the master device-A 110, the slave interface-A 141 arbitrates response according to the characteristics of the master device-A 110. The slave interface-A 141 includes a reorder buffer for applying memory interleaving to a request of the same transaction ID. When memory requests having the same transaction ID are transferred to the slave device-X 150 and the salve device-Y 160, the salve devices 150 and 160 each transfer requested data to the salve interface-A 141. In spite of requests of the same ID, times of reaching the reorder buffer of the slave interface-A 141 may be different from each other. Response data, which are stored in a reorder buffer, provided from different slave devices may be output after being reorganized in the order that the master device-A 110 requests.

In case of excessive increase of traffic at a reorder buffer, the slave interface-A 141 may decide transfer priority of stored data based on operating characteristics of the master device-A 110 that the slave interface-A 141 is tied. For this operation, the slave interface-A 141 includes a reorder buffer 141 and a control logic (not shown). For example, it is assumed that performance of the master device-A 110 is determined by time to arrival time of response data provided first. Under the assumption, the slave interface-A 141 may be set to primarily provide first burst data of respective required transactions among a series of data stored in a reorder buffer. In addition, transfer priority of data stored in the reorder buffer to a master device may be set according to various characteristics of master devices.

The slave devices 150 and 160 are devices each executing a command in response to a command received from one of master devices 110, 120 and 130. For example, the salve devices 150 and 160 may be a volatile memory device such as a dynamic random access memory (DRAM). Alternatively, the slave devices 150 and 160 may be a nonvolatile memory device such as a flash memory. The slave devices 150 and 160 may further include a memory controller for operating a volatile or nonvolatile memory device.

According to the above description, a slave interface of the inventive concept arbitrates response data according to characteristics of a corresponding master device. That is, the slave interface decides output priority of response data stored in a reorder buffer according to operation characteristics of the master device. The slave interface may output the response data to the master device according to the decided priority. According to the slave interface of the inventive concept, data arbitration for bidirectional transfer of request and response may be performed to implement a high-performance system-on-a-chip (SoC).

Figure 3:
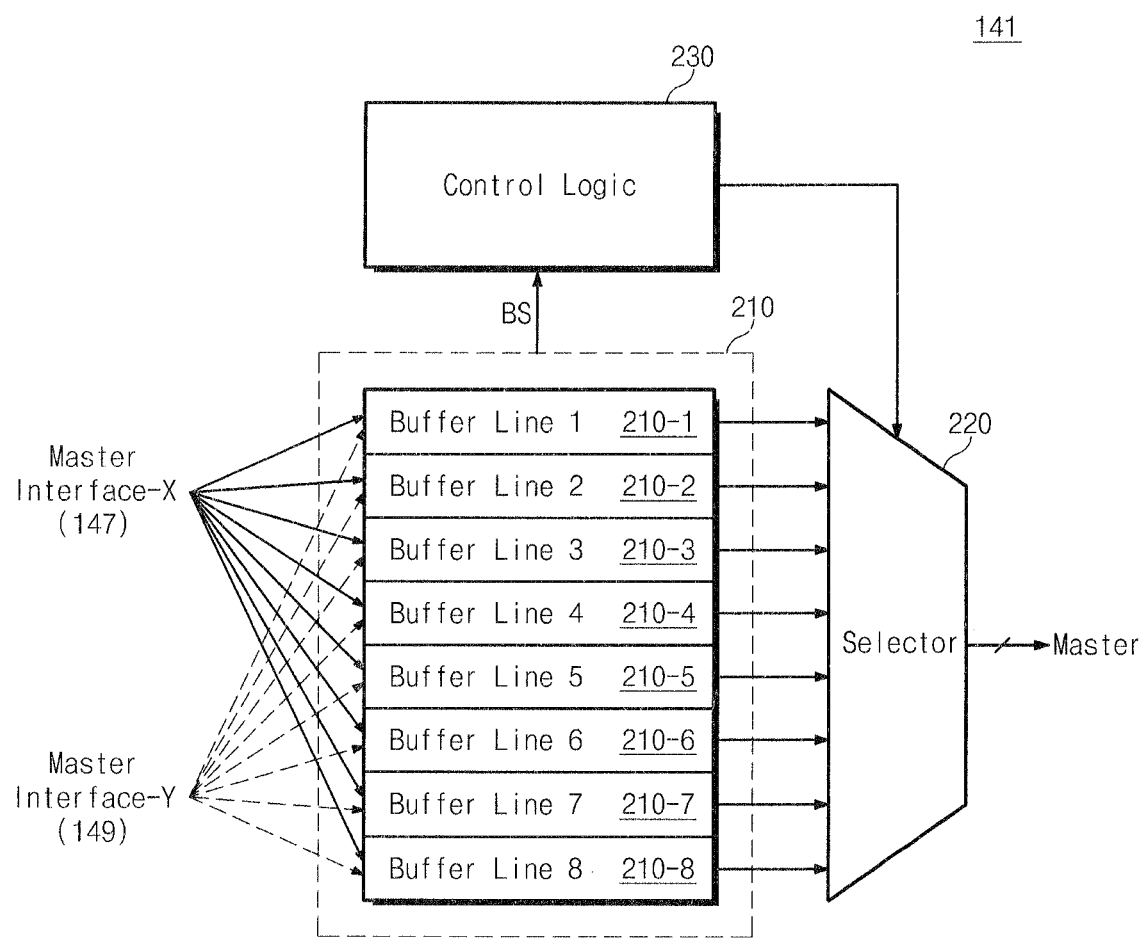
FIG. 3 is a block diagram showing a configuration of a slave interface according to one embodiment of the inventive concept.

FIG. 3 is a block diagram of a slave interface according to one embodiment of the inventive concept. Referring to FIG. 3, a slave interface-A 141 of FIG. 2 includes a reorder buffer 210, a selector 220, and a control logic 230.

The reorder buffer 210 includes a plurality of buffer lines 210-1 to 210-8 temporarily storing response data provided from a plurality of master interfaces 147 and 149. The reorder buffer is presumed to have eight buffer lines 210-1 to 210-8. Each of the buffer lines may store response data provided from any slave devices 150 and 160. The reorder buffer 210 may monitor a state of the respective buffer lines. The reorder buffer 210 may have a buffer state information BS when the number of buffer lines which stores response data is larger than a specific number. For example, a buffer state information BS is set to "1" when the number of buffer lines which stores response data is 8 (eight) or the reorder buffer 210 is full; otherwise, the buffer state information BS is set to "0". An entry of the buffer lines 210-1 to 210-8 will be described later in detail with reference to FIG. 4.

The selector 220 performs an 8-to-1 arbitration operation in response to a control signal 230a from the control logic 230. The selector 220 may select one of the buffer lines 210-1 to 210-8 and transfer response data stored in the selected buffer line to the master device-A 110.

The control logic 230 controls the selector 220 based on buffer state information BS. The buffer state information BS indicates a traffic state of response data input to the reorder buffer 210. When a traffic of response data stored in the reorder buffer 210 is less than a reference value, the control logic 230 controls the selector 220 to select the buffer lines 210-1 to 210-8 in the order the master interfaces 147 and 148 transfer response data from the slave devices 150 and 160 to the buffer lines 210-1 to 210-8. On the other hand, when traffic of response data stored in the reorder buffer 210 is more than a reference value, the control logic 230 performs an 8:1 arbitration operation based on characteristics of the master device-A 110.

An example of an arbitration operation in accordance with the inventive concept is to schedule the order that the slave interface-A 141 outputs response data stored in the reorder buffer 210 according to operation characteristics of the master device-A 110. The arbitration for the reorder buffer 210 performed by the control logic 230 enhances performance of the master device-A 110. Accordingly, the performance of the SoC semiconductor device 100 may be maximized through the arbitration of response data from the slave devices 150 and 160.

FIG. 4 is a table showing an exemplary entry of response data stored in the reorder buffer 210 shown in FIG. 3. Referring to FIG. 4, each buffer line of the reorder buffer 210 may include a transaction ID field 210-*a*, a burst-length field 210-*b*, a resident count field 210-*c*, and a response data field 210-*d*.

The transaction ID field may store information corresponding to a transaction ID of response data stored in each buffer line. The burst-length field 210-*b* may store information about a burst length which represents the number of data a slave device can output sequentially per a request that a master device issues to the slave device. The resident count field 210-*c* may store a duration time for which a buffer line holds the buffered response data. The resident count field 210-*c* may be reset when corresponding response data is transferred to a master device.

The response data field 210-*d* may have enough buffer size to store response data to a maximum burst length. For brevity of explanation, the maximum burst length is 8, and the reorder buffer 210 is in a state where all the buffer lines are occupied with response data so that a response data traffic between the plurality of slave devices 150 and 160 and the reorder buffer 210 is bottlenecked.

Figure 5:
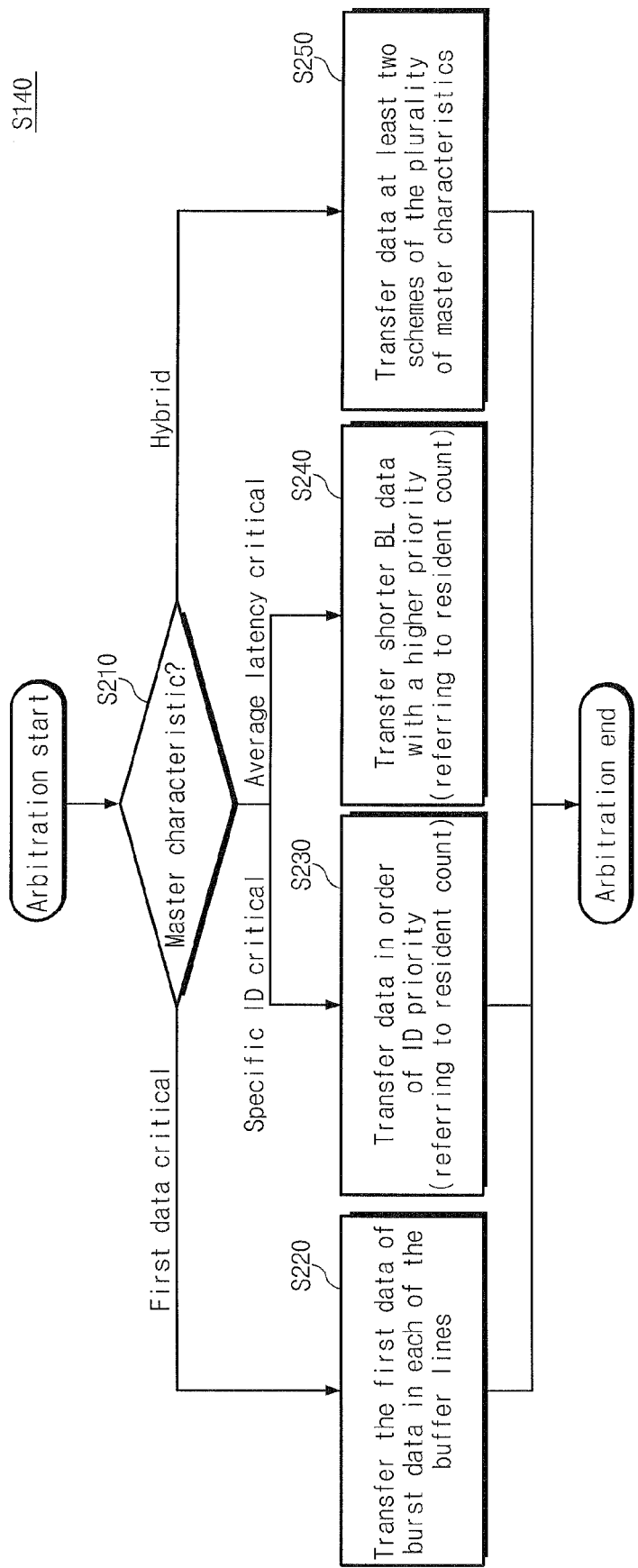
FIG. 5 is a flowchart illustrating an arbitration method according to one embodiment of the inventive concept.

FIG. 5 is a flowchart illustrating how the control logic 230 of FIG. 3 performs an arbitration operation based on operation characteristics of a master device. Referring to FIG. 5, the slave interface-A 141 of FIG. 3 may perform an arbitration operation in various schemes according to operation characteristics of the master device-A 141 of FIG. 3 to which the slave interface 141 is dedicated. When buffer state information BS indicating that there is an excessive traffic is provided from a reorder buffer (210 in FIG. 3), a control logic 230 starts an arbitration operation referring to the characteristics of the master device.

At the step of S210, the control logic 230 selects an arbitration mode based on operation characteristics of the mater device-A 110. The operation characteristics of the master device-A 110 may be one of "first data critical," "specific ID critical," "average latency critical," and "hybrid." For example, the master device-A 110 has an operation characteristic of "first data critical" when its performance is sensitive to latency for which the master device-A 100 waits to receive first data of response data after it issued a request. For the operation characteristic of "first data critical," the operation flow proceeds to a step of S220. The master device-A 110 has also operation characteristics of "specific ID critical" when its performance is sensitive to response data having a specific transaction ID. For the operation characteristic of "specific ID critical," the operation flow proceeds to the step of S230. The master device-A 110 has also an operation characteristic of "average latency critical" when its performance is sensitive to average latency of the response data, For the operation characteristic of "average latency critical," the operation flow proceeds to the step of S240. In the case where the master device-A 110 has combined operation characteristics, the operation flow proceeds to the step of S250 for executing a complex arbitration scheme.

Among a plurality of arbitration modes, the step of S220 may be referred to as a first arbitration mode, the step of S230 may be referred to as a second arbitration mode, the step of S240 may be referred to as a third arbitration mode, and the step of S250 may be referred to as a fourth arbitration mode.
First Data Critical—S220 (First Arbitration Mode)

The operation step of S220 is an arbitration operation where the performance of the master device-A 110 is sensitive to latency that it took for the master device-A 110 to receive first data transferred from one of the slave memory devices 150 and 160 after the master device-A 110 issued a request.

For example, under the state of the reorder buffer 210 shown in FIG. 4, the control logic 230 may control the selector 220 to select each first data of buffer lines 210-1 to 210-8 in increasing buffer number order for giving access priority to first data respectively stored in the buffer lines. The control logic 230 controls the selector 220 to select first data of a first buffer line 210-1 and continues to select first data stored in other buffer lines 210-2 to 210-8 in an increasing buffer number order. When the selector 220 reaches the eighth buffer line 210-8, the control logic 230 controls the selector 220 to wrap back to select the first buffer line 210-1, to select the second data stored in the first buffer line 210-1, and to repeat to select second data of other buffer lines 210-2 to 210-8. Accordingly, the order that the slave interface 141 transfers data to the master 110 is as follows: 0x11→0x21→0x31→0x41→0x51→0x61→0x71→0x81→ . . . →0x18→0x28→0x38→0x48→0x58→0x68→0x78→0x88.

The performance of a cache operation of a central processing unit (CPU) is sensitive to latency. Accordingly, the first arbitration mode may improve the performance of the SoC 100 by reducing latency of the first data transferred to the master device-A 110.
Specific ID Critical—S230 (Second Arbitration Mode)

The operation step of S230 is an arbitration operation where the performance of the master device-A 110 is sensitive to data of a specific transaction ID that is first transferred to the master device-A 110. When performance of the master device-A 110 is sensitive to data of a specific transaction ID, the control logic 230 may give priority to the specific transaction ID to enhance performance of the master device-A 110.

Under the operation step of S220, data of a transaction ID that the control logic 230 does not give priority may be forcibly transferred to the master device-A 110 a predetermined time after being stored into the reorder buffer 210. The predetermined time after being stored into the reorder buffer 210 may be measured by the resident count field described in the table in FIG. 4. When a value of a resident count reaches a specific value (0xff), the low-priority transaction ID data is output earlier than high-priority ID data. When the master device-A 110 performs a multi-format codec (MFC) function, a response delay of a specific transaction ID has an adverse effect on video encoding/decoding performance. For simplicity of explanation, MFC data is presumed to occupy the reorder buffer 210 as shown in FIG. 4. And it is assumed that data of which transaction ID is 4 and 5 have the greatest effect on the performance of the master device-A 110 while data of which transaction ID is 8 has the least effect on the performance of the master device-A 110. Priority of response data, in view of an effect on the performance of the master device-A 110, is as follows: ID4=ID5>ID1=ID2=ID3=ID6=ID7>ID8. Accordingly, the order that the slave interface 141 transfers response data to the master device-A 110 is as follows: ID4 (0x41→0x42→ . . . →0x48) ID5 (0x51→0x52→ . . . →0x58)→ . . . →ID7 (0x71→0x72→ . . . →0x78)→ID8 (0x81→0x82→ . . . →0x88). Although data of which transaction ID is 8 has the smallest priority, the value of the resident count reaches to the specific value 0xff and as a result, the data is forcibly transferred irrespective of its priority. Data of the other transaction IDs are transferred according to ID priority. As a result, the sequence that the slave interface 141 is as follows: ID8 (0x81→0x82→ . . . →0x88) (ID4 (0x41→0x42→ . . . →0x48)→ID5 (0x51→0x52→ . . . →0x58)→ . . . →ID7 (0x71→0x72→ . . . →0x78).

When data is transferred to the master device-A 110 according to the ID priority, the interconnector 140 may be occupied by a data traffic affecting the performance of the master device-A 110 and that as a result, SoC performance may be enhanced.

Average Latency Critical—S240 (Third Arbitration Mode)

The operation step of S240 is an arbitration operation where the performance of the master device-A 110 is sensitive to average latency which the master device-A 110 takes in order to receive all data stored in a buffer line. Average latency is latency divided by burst length. For example, data having smaller latency have larger average latency. Accordingly, when performance of the master device-A 110 is sensitive to average latency, the control logic 230 may give priority to data having shorter burst length.

Under the operation step of S230, data having a large burst length that the control logic 230 does not give priority may be forcibly transferred to the master device-A 110 a predetermined time after being stored into the reorder buffer 210. The predetermined time after being stored into the reorder buffer 210 may be measured by the resident count field 210-c described in the table in FIG. 4. When a value of a resident count reaches a specific value (e.g., 0xff), the low-priority data having a large burst length is output earlier than data having a higher priority. Assuming that response data occupies the reorder buffer 210 as shown in FIG. 4, the second and third buffer lines 210-2 and 210-3 respectively have a burst length of 4, which is the smallest burst length that response data stored in the reorder buffer 210 have. Burst length of first, fifth, and sixth response data 210-1, 210-5 and 210-6 respectively is 6. Burst length of seventh and eighth data 210-7 and 210-8 is 8, which is the largest burst length. Accordingly, transfer priority (e.g., ID2=ID3=ID4>ID1=ID5=ID6>ID7=ID8) may be applied. In consideration of the transfer priority and resident count, a transfer order of response data is as follows: No8 (0x81→0x82→ . . . →0x88)→No2→No3→No4→No1→No5→No6 (0x61→0x62→0x63→0x64→0x65→0x66→0x67→0x68)→No7 (0x71→0x72→ . . . →0x78).

Although the response data stored in the eighth buffer line 210-8 has the lowest transfer priority in light of average latency, the data is first transferred because the eight buffer line 210-8 has a resident count value that reaches the specific count value 0xff. The other response data are transferred according to their priority in light of average latency. When data is transferred to the master device-A 110 according to the priority in light of average latency, the SoC 100 will have an improved performance.

Hybrid—S250 (Fourth Arbitration Mode)

The operation step of S250 is an arbitration operation where the performance of the master device-A 110 is sensitive to various operation characteristics explained above (e.g., first latency critical, specific ID critical, and average latency critical). For the purpose of arbitration of response data, the control logic 230 may set a transfer priority of data stored in each of the buffer lines 210-1 to 210-8 based upon operation characteristics. For example, when it is assumed that the master device-A 110 is in a hybrid state of the specific ID critical and the average latency critical, the control logic 230 may be set to put a higher priority on the specific ID critical. Even under the priority, data of a buffer line having a resident count value that reaches to a specific value 0xff may be transferred earlier over data having a higher priority.

Under the hybrid condition, considering the transfer priority and resident count, a transfer order of response data is as follows: No8 (0x81→0x82→ . . . →0x88)→No4→No5→No2→No3→No1→No6→No7 (0x71→0x72→ . . . →0x78).

The response data stored in the eighth buffer line 210-8 is transferred first because the resident count value reaches the specific value 0xff. The other response data are transferred according to the hybrid priority. This priority makes it possible to implement an optimal arbitration operation for the master device-A 110 having various operation characteristics.

Figure 6:
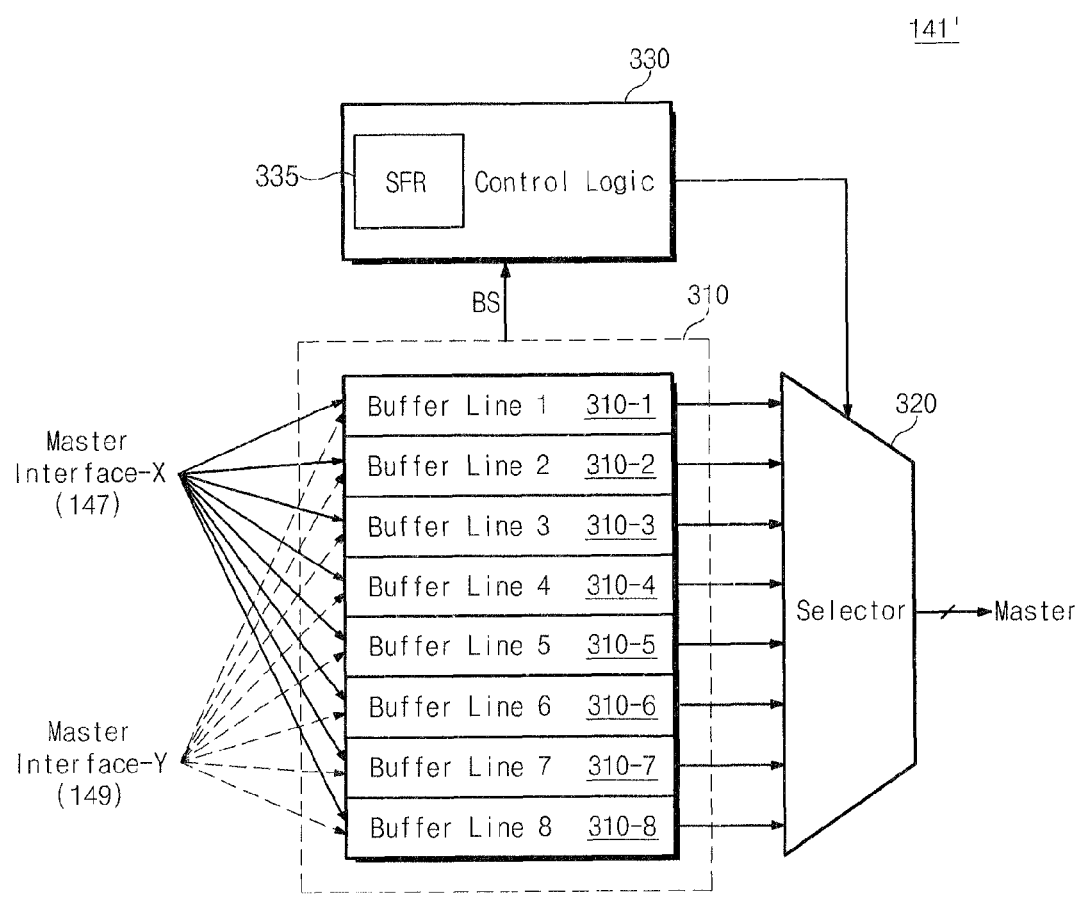
FIG. 6 is a block diagram showing a configuration of a slave interface according to another embodiment of the inventive concept.

FIG. 6 is a block diagram of a slave interface 141 of FIG. 2 according to another embodiment of the inventive concept. Referring to FIG. 6, a slave interface 141' includes a reorder buffer 310, a selector 320, and a control logic 330 including a specific function register (SFR) 335. The reorder buffer 310 has the same structure with that of the reorder buffer 210 of FIG. 3 and performs in the same way with that of the reorder buffer 210 of FIG. 3.

The control logic 330 controls the selector 320 based on the buffer state information BS indicating a traffic state of response data between the reorder buffer 310 and the master interfaces 147 and 149. When traffic of response data stored in the reorder buffer 310 is less than a reference value, the control logic 330 performs an 8:1 arbitration operation to output data in the order of the data issued from master interfaces 147 and 149. On the other hand, when the traffic of response data stored in the reorder buffer 310 increases above the reference value, the control logic 330 performs an 8:1 arbitration operation based on operation characteristics of the master device-A 110.

As an example considering the characteristics of the master device, an output order of data stored in the reorder buffer 310 is determined based on operation characteristics of a master device issuing a request. An arbitration operation performed by the control logic 330 for the reorder buffer 310 is based on operation characteristics of the master device-A 110. Particularly, the control logic 330 according to the inventive concept includes a specific function register (SFR) 335 for storing operation characteristics of the master device-A 110. For example, the specific function register (SFR) 335 may store operation characteristics such as first latency critical, specific ID critical, average latency critical, and hybrid. Based on the operation characteristics stored in the specific function register 335, the control logic 330 may determine transfer priority of response data corresponding to the request of the master device-A 110. The specific function register 335 may be set by a user.

A semiconductor device according to the inventive concept may be packaged as one of various types to be subsequently embedded. For example, the semiconductor device may be packaged by one of PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP).

According to the inventive concept described so far, arbitration of response data transferred to a master device is carried out according to characteristics of the master device to implement a bus system providing response data optimized for operation conditions of the master device.

While the inventive concept has been particularly shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A system-on-a-chip semiconductor device comprising:
    a first master configured to issue a request having a transaction ID;
    a plurality of slaves configured to provide data in response to the request; and
    an interconnector configured to include a slave interface and one or more master interfaces, the slave interface being configured to provide the request to the one or more master interfaces and supply response data to the first master based on operation characteristics of the first master,
    wherein the slave interface includes:
        a reorder buffer configured to store the response data,
        a selector configured to selectively output the response data stored in the reorder buffer, and
        a control logic configured to control the output order of the response data according to a state of the reorder buffer.

2. The system-on-a-chip semiconductor device as claimed in claim 1, wherein the interconnector includes a bus connecting the slave interface and the master interfaces.

3. The system-on-a-chip semiconductor device as claimed in claim 1, wherein the control logic decides transfer priority of response data stored in the reorder buffer in accordance with operation characteristics of the first master.

4. The system-on-a-chip semiconductor device as claimed in claim 3, wherein the operation characteristics of the master are determined by whether a performance of the master is sensitive to a first transfer latency, a specific ID of data, and average latency.

5. The system-on-a-chip semiconductor device as claimed in claim 1, wherein the reorder buffer includes a plurality of buffer lines, each of the plurality of buffer lines including a transaction ID field, a burst-length field, a resident count field, and a data field.

6. The system-on-a-chip semiconductor device as claimed in claim 5, wherein the slave interface outputs data stored in the buffer line whose resident count field has a predetermined value.

7. The system-on-a-chip semiconductor device as claimed in claim 3, wherein the control logic further includes a specific function register (SFR) configured to store the characteristics of the master.

8. The system-on-a-chip semiconductor device as claimed in claim 7, wherein the specific function register is set when the master issues a request.

9. The system-on-a-chip semiconductor device as claimed in claim 1, wherein the slave interface is configured to perform a multi-outstanding address function and a memory interleaving function.

10. An arbitration method of an interconnector transferring a plurality of response data provided from a plurality of slaves to a master, the arbitration method comprising:
    selecting one of a plurality of arbitration modes based on operation characteristics of the master;
    storing the response data in a reorder buffer;
    controlling an output order of the response data stored in the reorder buffer according to the selected arbitration mode; and
    transferring the response data stored in the reorder buffer according to the output order.

11. The arbitration method as claimed in claim 10, wherein the plurality of arbitration modes include a first arbitration mode for the master that is sensitive to latency of the response data, a second arbitration mode for the master that is sensitive to a specific transaction ID of the response data, and a third arbitration mode for master that is sensitive to average latency of the response data.

12. The arbitration method as claimed in claim 11, wherein irrespective of the output order, data are forceably transferred when the data has a resident count value of a specific value.

13. The arbitration method as claimed in claim 11, wherein among the plurality of response data, response data corresponding to a specific ID is primarily transferred in the second arbitration mode.

14. A system-on-a-chip semiconductor device comprising:
    a first master configured to issue a request;
    a first slave interface configured to be dedicated to the first master;
    a plurality of master interfaces; and
    a bus configured to arbitrate data from the plurality of master interfaces to the first slave interface, wherein the first slave interface is configured to supply the data to the first master based on operation characteristics of the first master,
    wherein the first slave interface includes:
        a reorder buffer for storing the data, wherein the reorder buffer includes a plurality of buffer lines;
        a control logic for determining an output order of the data stored in the reorder buffer based on operation characteristics of the first master; and
        a selector for selecting one of the plurality of buffer lines.

15. The system-on-a-chip semiconductor device as claimed in claim 14, the control logic further includes a register for storing the operation characteristics of the first master.

* * * * *